(12) United States Patent
Sivertsen (10) Patent No.: US 9,230,510 B1
(45) Date of Patent: Jan. 5, 2016

(54) DOUBLE-SIDED DISPLAY DEVICES

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 69 days.

(21) Appl. No.: 14/032,950

(22) Filed: Sep. 20, 2013

(51) Int. Cl.
*G09G 5/10* (2006.01)

(52) U.S. Cl.
CPC ........................................ *G09G 5/10* (2013.01)

(58) Field of Classification Search
CPC ....................................................... G09G 5/10
USPC ................... 345/1.1, 102, 30, 32, 38–39, 40; 455/566; 362/561, 600; 349/62
See application file for complete search history.

(56) References Cited

U.S. PATENT DOCUMENTS

| | | | |
|---|---|---|---|
| 2005/0052383 A1* | 3/2005 | Suzuki | 345/87 |
| 2008/0062069 A1* | 3/2008 | Sinclair et al. | 345/8 |
| 2008/0122811 A1* | 5/2008 | Kitagawa | 345/204 |

* cited by examiner

*Primary Examiner* — Shaheda Abdin
(74) *Attorney, Agent, or Firm* — Locke Lord LLP; Tim Tingkang Xia, Esq.

(57) ABSTRACT

Certain aspects direct to a double-sided display device, which includes a backlight module; two display panels respectively disposed at two light-emitting sides of the backlight module, two input ports; and a controller. When the controller receives video signals from only one of the two input ports, the controller generates display signals according to the video signals, and sends the display signals to the two display panels to control the pixels of the two display panels to simultaneously display the same video signals. When the controller receives the video signals from both of the two input ports, the controller generates two separate streams of display signals respectively according to the video signals received from the two input ports, and send the two separate streams of display signals respectively to the two display panels to control the two display panels to respectively display the video signals received from the two input ports.

23 Claims, 6 Drawing Sheets

DOUBLE-SIDED DISPLAY DEVICES

FIELD

The present disclosure generally relates to double-sided display devices, and more particularly to double-sided display devices being capable of displaying the same video signals or displaying different video signals simultaneously from two sources.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Signage devices are widely used to deliver contents in the information broadcasting and advertising areas. Traditionally, signage devices include static display on signage device. Static signage devices may not be easily replaced, and their displays are not flexible and their contents are fixed. With modern technology particularly in the large LED/LCD display area, digital signage devices are currently widely used due to their easy-to-replace characteristics, high efficiencies, relatively low costs, flexible display contents with real-time update ability. The digital signage devices can be used to show television programming, advertisements, traffic information, directional displays, menus, information, and other messages. Signage devices usually utilize technologies such as a matrix of lighting devices (e.g., light bulbs), LCD, LED, plasma displays, or projected images to display content. Digital signage devices can be found in both public and private environments, including retail stores, hotels, restaurants, and corporate buildings, amongst other locations.

In some occasions, the digital signage devices may be placed in an open area, where the viewers may exist around the digital signage devices or pass by the digital signage devices in any direction. Thus, there is a need for the digital signage devices to be viewable from any direction such that the viewers may see the information displayed on the digital signage devices.

Therefore, heretofore unaddressed needs still exist in the art to address the aforementioned deficiencies and inadequacies.

SUMMARY

Certain aspects of the present disclosure direct to a double-sided display device. In certain embodiments, the double-sided display device includes: a backlight module configured to emit light, wherein the backlight module includes two light-emitting sides; two display panels respectively disposed at the two light-emitting sides of the backlight module, wherein each display panel defines a plurality of pixels in a pixel matrix; two input ports; and a controller electrically connected to the backlight module, the two display panels and the two input ports, wherein the controller includes a processor and a non-volatile memory storing computer executable codes. The codes, when executed at the processor, is configured to: receive video signals from at least one of the two input ports; control the backlight module to emit light; when the controller receives the video signals from only one of the two input ports, generate display signals according to the video signals, and send the display signals to the two display panels to control the pixels of the two display panels to simultaneously display the same video signals; and when the controller receives the video signals from both of the two input ports, generate first display signals according to the video signals received from one of the two input ports and second display signals according to the video signals received from the other of the two input ports, and send the first display signals to one of the two display panels and the second display signals to the other of the two display panels to control the two display panels to respectively display the video signals received from the two input ports.

In certain embodiments, the codes include: a backlight control module configured to control the backlight module to emit light; a signal input/output (I/O) module configured to determine whether the controller receives the video signals from one or both of the two input ports, and generate instructions according to the determination; and a pixel control module configured to generate the display signals for the two display panels according to the instructions generated by the signal I/O module, and send the display signals respectively to the two display panels to control the pixels of the display panels.

In certain embodiments, when the controller receives the video signals from only one of the two input ports, the signal I/O module is configured to generate an instruction according to the video signals for displaying the video signals on both of the display panels, and send the instruction to the pixel control module. In certain embodiments, when the pixel control module receives the instruction from the signal I/O module, the pixel control module is configured to generate the display signals according to the instruction, and send the display signals simultaneously to both of the display panels.

In certain embodiments, when the controller receives the video signals from both of the two input ports, the signal I/O module is configured to: generate a first instruction according to the video signals received from one of the input ports for displaying the video signals on one of the display panels, generate a second instruction according to the video signals received from the other of the input ports for displaying the video signals on the other of the display panels, and send the first instruction, the second instruction and the video signals to the pixel control module. In certain embodiments, when the pixel control module receives the first instruction, the second instruction and the video signals from the signal I/O module, the pixel control module is configured to: generate the first display signals according to the first instruction, generate the second display signals according to the second instruction, and send the first display signals to one of the two display panels, and send the second display signals to the other of the two display panels.

In certain embodiments, the codes further include a data store configured to store parameters of the display panels.

In certain embodiments, the display signals include a plurality of scan signals and a plurality of data signals. In certain embodiments, each of the display panels includes: a scan driver electrically connected to the controller, configured to receive the scan signals from the controller; a data driver electrically connected to the controller, configured to receive the data signals from the controller; a plurality of scan lines electrically connected to the scan driver, each scan line configured to receive one of the scan signals from the scan driver; and a plurality of data lines electrically connected to the data driver, each data line configured to receive one of the data signals from the data driver. The scan lines and data lines cross over to define the plurality of pixels.

In certain embodiments, the double-sided display device further includes two cameras respectively disposed at two sides of the backlight module, wherein each camera is configured to capture an image frame.

In certain embodiments, the codes further include a camera control module configured to control each of the cameras to capture the image frames.

Certain aspects of the present disclosure directs to a method of controlling a double-sided display device, which includes: receiving, at a controller, video signals from at least one of two input ports of the double-sided display device; controlling a backlight module of the double-sided display device to emit light, wherein the backlight module comprises two light-emitting sides; when the video signals are received from only one of the two input ports, generating, at the controller, display signals according to the video signals, and sending the display signals to two display panels of the double-sided display device, wherein the two display panels are respectively disposed at the two light-emitting sides of the backlight module, each display panel defines a plurality of pixels in a pixel matrix, and wherein the display signals are configured to control the pixels of the two display panels to simultaneously display the same video signals, and when the video signals are received from both of the two input ports, generating, at the controller, first display signals according to the video signals received from one of the two input ports and second display signals according to the video signals received from the other of the two input ports, and sending the first display signals to one of the two display panels and the second display signals to the other of the two display panels to control the two display panels to respectively display the video signals received from the two input ports.

In certain embodiments, the method further includes: controlling two cameras of the double-sided display device to capture image frames, wherein the two cameras are respectively disposed at the two light emitting sides of the backlight module.

In certain embodiments, the controller stores computer executable codes, including: a backlight control module configured to control the backlight module to emit light; a signal input/output (I/O) module configured to determine whether the controller receives the video signals from one or both of the two input ports, and generate instructions according to the determination; a pixel control module configured to generate the display signals for the two display panels according to the instructions generated by the signal I/O module, and send the display signals respectively to the two display panels to control the pixels of the display panels; and a camera control module configured to control two cameras to respectively capture image frames, wherein the two cameras are respectively disposed at two sides of the backlight module.

In certain embodiments, when the video signals are received from only one of the two input ports, the controller generates the display signals by: generating, at the signal I/O module, an instruction according to the video signals for displaying the video signals on both of the display panels; sending the instruction from the signal I/O module to the pixel control module; and generating, at the pixel control module, the display signals according to the instruction.

In certain embodiments, when the video signals are received from both of the two input ports, the controller generates the first display signals and the second display signals by: generating, at the signal I/O module, a first instruction according to the video signals received from one of the input ports for displaying the video signals on one of the display panels; generating, at the signal I/O module, a second instruction according to the video signals received from the other of the input ports for displaying the video signals on the other of the display panels; sending the first instruction and the second instruction from the signal I/O module to the pixel control module; generating, at the pixel control module, the first display signals according to the first instruction; and generating, at the pixel control module, the second display signals according to the second instruction.

In certain embodiments, the display signals include a plurality of scan signals and a plurality of data signals. In certain embodiments, each of the display panels includes: a scan driver electrically connected to the controller, configured to receive the scan signals from the controller; a data driver electrically connected to the controller, configured to receive the data signals from the controller; a plurality of scan lines electrically connected to the scan driver, each scan line configured to receive one of the scan signals from the scan driver; and a plurality of data lines electrically connected to the data driver, each data line configured to receive one of the data signals from the data driver. The scan lines and data lines cross over to define the plurality of pixels.

Certain aspects of the present disclosure direct to a non-transitory computer readable medium storing computer executable codes for controlling a double-sided display device. The codes, when executed at the processor, is configured to: receive video signals from at least one of two input ports; control a backlight module to emit light, wherein the backlight module comprises two light-emitting sides; when the video signals are received from only one of the two input ports, generate display signals according to the video signals, and send the display signals to two display panels respectively disposed at the two light-emitting sides of the backlight module, wherein each display panel defines a plurality of pixels in a pixel matrix, and wherein the display signals are configured to control the pixels of the two display panels to simultaneously display the same video signals, and when the video signals are received from both of the two input ports, generate first display signals according to the video signals received from one of the two input ports and second display signals according to the video signals received from the other of the two input ports, and send the first display signals to one of the two display panels and the second display signals to the other of the two display panels to control the two display panels to respectively display the video signals received from the two input ports.

In certain embodiments, the codes include: a backlight control module configured to control the backlight module to emit light; a signal input/output (I/O) module configured to determine whether the controller receives the video signals from one or both of the two input ports, and generate instructions according to the determination; a pixel control module configured to generate the display signals for the two display panels according to the instructions generated by the signal I/O module, and send the display signals respectively to the two display panels to control the pixels of the display panels; and a camera control module configured to control two cameras to respectively capture image frames, wherein the two cameras are respectively disposed at two sides of the backlight module.

In certain embodiments, when the video signals are received from only one of the two input ports, the signal I/O module is configured to generate an instruction according to the video signals for displaying the video signals on both of the display panels, and send the instruction to the pixel control module. In certain embodiments, when the pixel control module receives the instruction from the signal I/O module, the pixel control module is configured to generate the display signals according to the instruction, and send the display signals simultaneously to both of the display panels.

In certain embodiments, when the video signals are received from both of the two input ports, the signal I/O module is configured to: generate a first instruction according to the video signals received from one of the input ports for displaying the video signals on one of the display panels, generate a second instruction according to the video signals received from the other of the input ports for displaying the video signals on the other of the display panels, and send the first instruction, the second instruction and the video signals to the pixel control module. In certain embodiments, when the pixel control module receives the first instruction, the second instruction and the video signals from the signal I/O module, the pixel control module is configured to: generate the first display signals according to the first instruction, generate the second display signals according to the second instruction, and send the first display signals to one of the two display panels, and send the second display signals to the other of the two display panels.

In certain embodiments, the codes further include a data store configured to store parameters of the display panels.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the interconnection lines between the elements of the drawings are generally shown as single lines. However, each single line may be implemented as a single connection between the interconnecting elements, or as multiple connections between the sub-elements of the interconnecting elements.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1A:
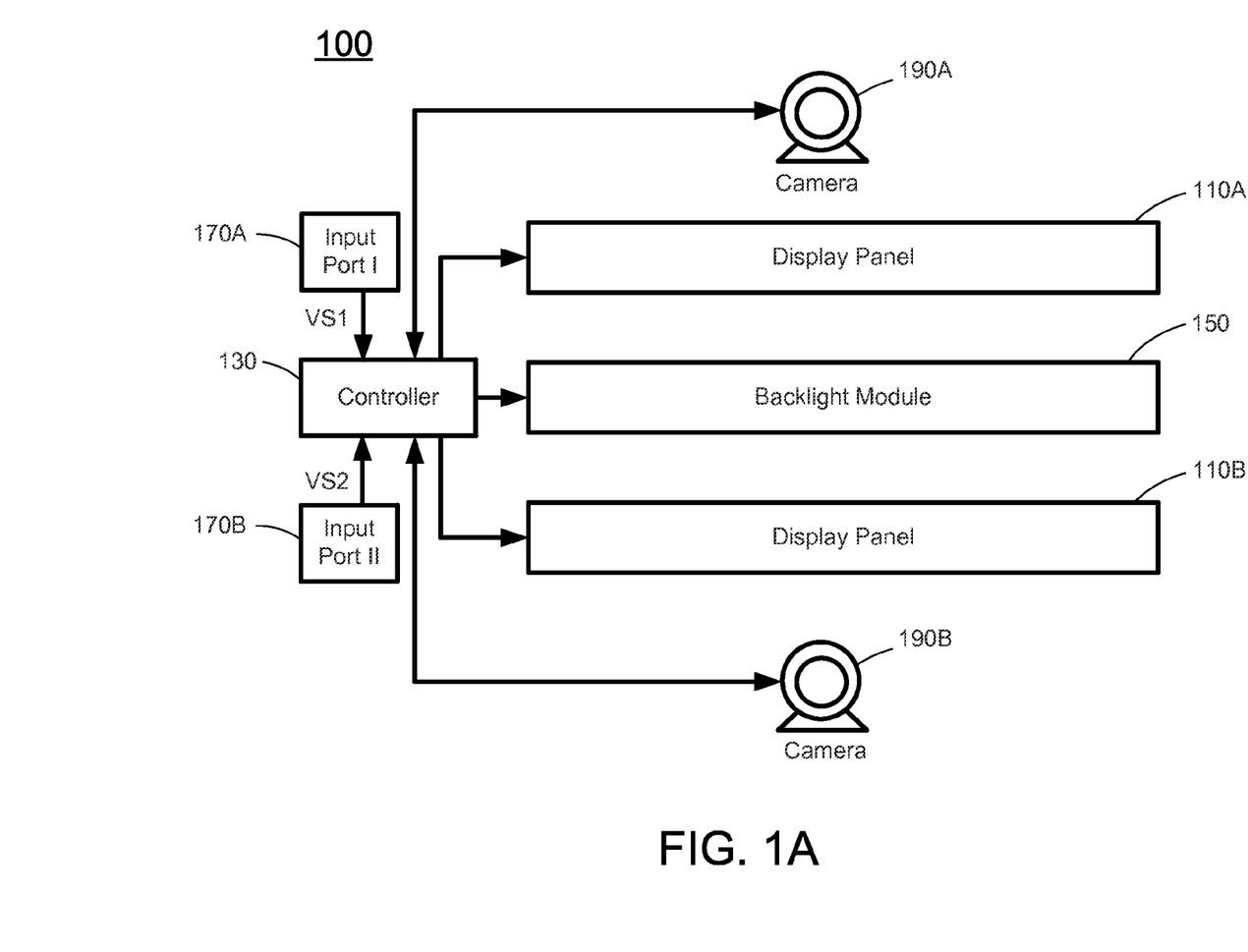
FIG. 1A schematically depicts a double-sided display device according to one embodiment of the present disclosure.
Figure 1B:
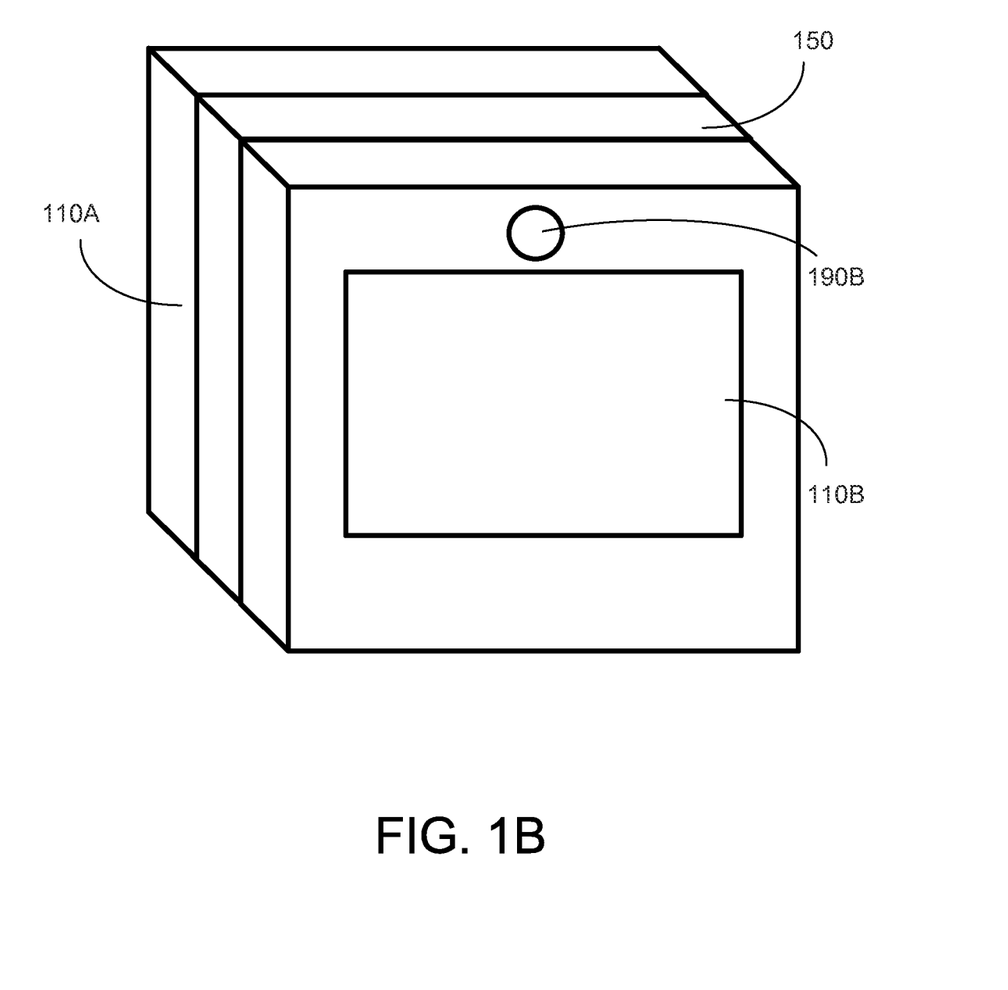
FIG. 1B schematically depicts the assembly of the double-sided display device as shown in FIG. 1A according to one embodiment of the present disclosure.

FIGS. 1A and 1B schematically depict a double-sided display device according to one embodiment of the present disclosure. In certain embodiments, the double-sided display device 100 can be a color display which adopts a color model. In certain embodiments, the double-sided display device 100 adopts the RGB color model, which is configured to display a broad array of colors by mixing the three primary colors of red (R), green (G) and blue (B).

As shown in FIG. 1A, the double-sided display device 100 includes two display panels 110A and 110B, a controller 130, a backlight module 150, two input ports 170A and 170B, and two cameras 190A and 190B. In certain embodiments, each of the display panels 110A and 110B can be an open-frame display, such as an open-frame LCD, which is commonly known in the industry. The controller 130 is electrically connected to the display panels 110A and 110B, the backlight module 150 and the cameras 190A and 190B, respectively. The backlight module 150 has two light-emitting sides (the up and bottom sides). The two input ports 170A and 170B are respectively connected to the controller 130, and are respectively configured to transmit video signals VS1 and VS2 to the controller 130.

As shown in FIG. 1B, the display panels 110A and 110B are respectively disposed at and attached to the two light-emitting sides of the backlight module 150, forming a sandwich structure. Further, the camera 190B is disposed at the same side as the display panel 110B. Although not explicitly shown in FIG. 1B, the other camera 190A is disposed at the same side as the display panel 110A. From now on, the "display panels 110" refer to both the display panels 110A and 110B, the "input ports 170" refer to both the input ports 170A and 170B, and the "cameras 190" refer to both the cameras 190A and 190B.

The display panels 110 are panels for displaying images. In certain embodiments, each of the display panels 110 can be any display panel which does not produce light itself, such as liquid crystal displays (LCDs) or any other types of displays. In certain embodiments, the display panel 110A and the display panel 110B can be the same display panels. In certain embodiments, each of the display panels 110 can be a RGB color display panel.

Figure 2A:
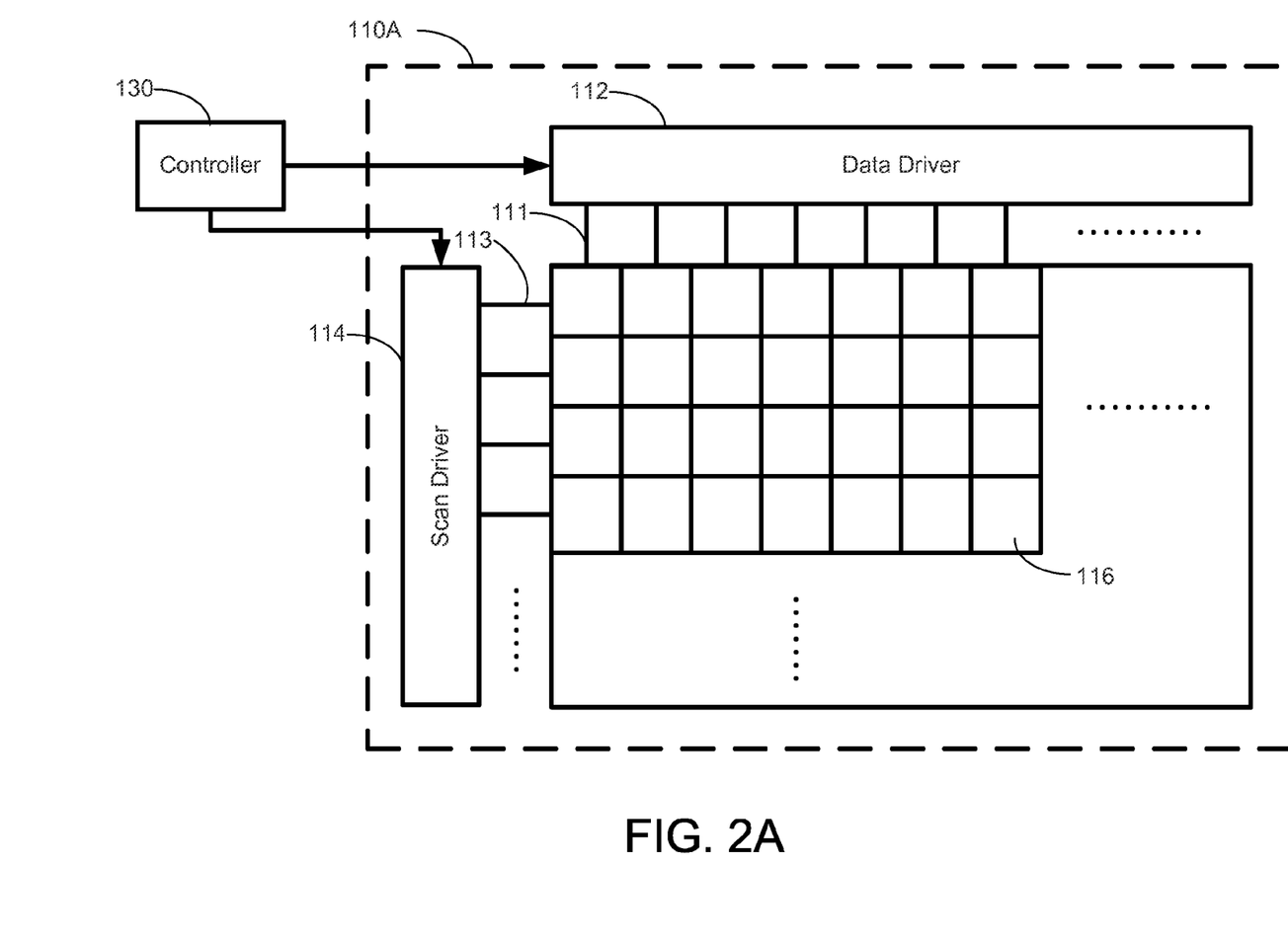
FIG. 2A schematically depicts one of the display panels of the display device according to one embodiment of the present disclosure.

FIG. 2A schematically depicts one of the display panels according to one embodiment of the present disclosure. As described above, the display panel 110A and the display panel 110B can be the same display panels. Although FIG. 2A does not show the display panel 110B, it should be appreciated that the display panel 110B may have the same structural elements as the display panel 110A.

As shown in FIG. 2A, the display panel 110A includes a data driver 112 and a scan driver 114 respectively connected to the controller 130 to receive data signals and scan signals. Further, a plurality of pixels 116 is defined on the display panel 110 to form a pixel matrix. The data driver 112 is electrically connected to a plurality of data lines 111 to transmit the data signals to each of the pixels 116, and the scan driver 114 is electrically connected to a plurality of scan lines 113 to transmit the scan signals to each of the pixels 116. In other words, each pixel 116 is electrically connected to at least one data line 111 and at least one scan line 113.

Figure 2B:
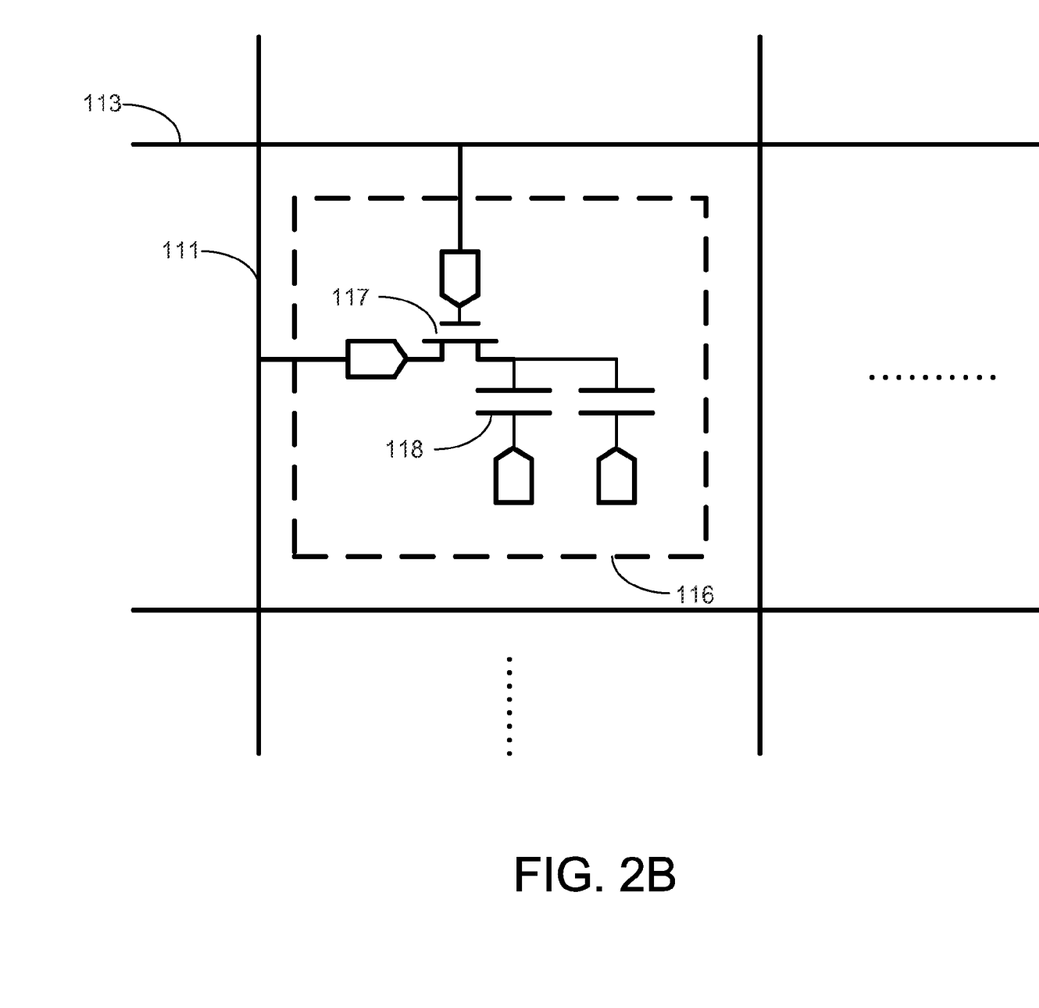
FIG. 2B schematically depicts a pixel according to one embodiment of the present disclosure.

FIG. 2B schematically depicts a pixel according to one embodiment of the present disclosure. As shown in FIG. 2B, a pixel 116 includes a pixel circuit, which is formed by a plurality of electronic elements, such as one or more thin-film transistors (TFTs) 117 and one or more capacitors 118. Interconnection of the electronic elements may vary according to different requirements of the pixel circuit. In certain embodiments, the TFT 117 serves as a switch. The source of the TFT 117 is connected to the data line 111 to receive the data signal, which controls the display of the pixel 116. The gate of the TFT 117 is connected to the scan line 113 to receive the scan signal, which controls the switch of the TFT 117. In certain embodiments, when the scan signal is at a high voltage level, the scan signal turns on the switch of the TFT 117 such that the data signal is transmittable from the source of the TFT 117 to the drain of the TFT 117. On the other hand, when the scan signal is at a low voltage level, the scan signal turns off the switch of the TFT 117, and the data signal is not transmittable to the drain of the TFT 117. Thus, by modulating the scan signals and the data signals, each pixel 116 may receive the corresponding data signal for displaying.

Figure 3A:
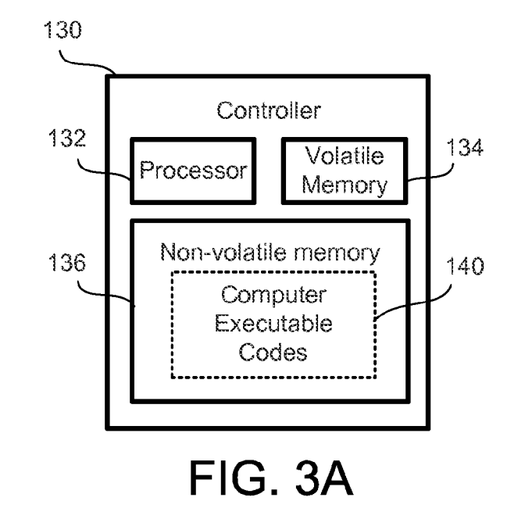
FIG. 3A schematically depicts a controller of the display device according to one embodiment of the present disclosure.

FIG. 3A schematically depicts a controller of the display device according to one embodiment of the present disclosure. The controller 130 controls the display panel 110 for displaying the images. Specifically, the controller 130 is configured to receive the video signals VS1 and/or VS2 from the input ports 170, to control the backlight module 150 and the cameras 190, and to control the pixels 116 of the display panels 110 according to the received input signals.

As shown in FIG. 3A, the controller 130 includes a processor 132 for executing instructions, a volatile memory 134, and a non-volatile memory 136. The controller 130 may be a regular computer, a special purpose computer, or a specialized microcontroller capable of being installed in a computer, such as a microcontroller unit (MCU), a service processor (SP) or a baseboard management controller (BMC). In certain embodiments, the controller 130 may be integrated with the display panel 110, or may be separated from the display panel 110. In certain embodiments, the controller 130 may include other storage devices in addition to the volatile memory 134 and the non-volatile memory 136. For example, the storage devices may include a hard disk, a CD-ROM, a static random-access memory, a flash memory, or any types of storage unit as long as it may store data.

The processor 132 is a host processor of the controller 130, controlling operation and executing instructions of the controller 130. The volatile memory 134 is a temporary memory storing information in operation, such as the instructions executed by the processor 132. For example, the volatile memory 134 may store the threshold matrix and the measurement matrix generated by the matrix generating module 144. In certain embodiments, the volatile memory 134 may be a random-access memory (RAM). In certain embodiments, the volatile memory 134 is in communication to the processor 132 through appropriate buses or interfaces. In certain embodiments, the controller 130 may include more than one processor 132 or more than one volatile memory 134.

The non-volatile memory 136 is a persistent memory for storing data and instructions even when not powered. For example, the non-volatile memory 136 can be a flash memory. In certain embodiments, the non-volatile memory 136 is in communication to the processor 132 through appropriate buses or interfaces. In certain embodiments, the controller 130 may include more than one non-volatile memory 136.

As shown in FIG. 3A, the non-volatile memory 136 stores computer executable codes 140. The codes 140 are configured, when executed at the processor 132, to generate signals for controlling the pixels 116 of the display panel 110, and control the inspection of the pixels 116.

Figure 3B:
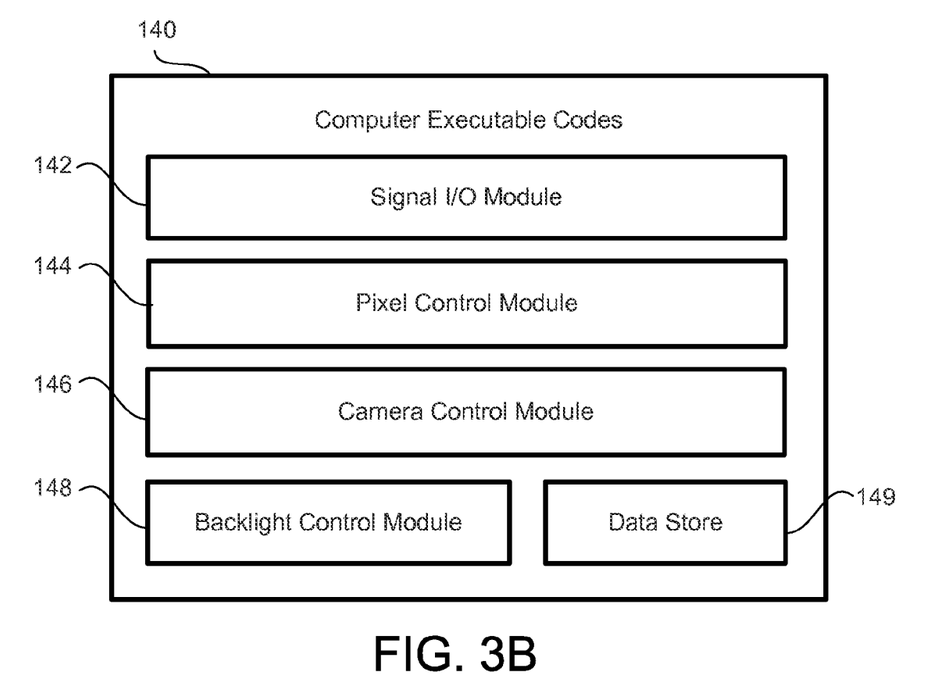
FIG. 3B schematically depicts computer executable codes of the controller according to one embodiment of the present disclosure.

FIG. 3B schematically depicts computer executable codes of the controller according to one embodiment of the present disclosure. As shown in FIG. 3B, the codes 140 include a signal input/output (I/O) module 142, a pixel control module 144, a camera control module 146, and a backlight control module 148. Optionally, the codes 140 may include one or more data stores 149 for storing parameters and operational data for the modules. For example, the data store 149 may store parameters of the display panels 110 and the cameras 190, such as the resolution of the display panels 110, the focus of the cameras 190, and other necessary parameters.

The signal I/O module 142 controls the correspondence of the input signals (video signals received from the input ports 170) and the corresponding output signals (the scan signals and the data signals) to the pixels 116 of the two display panels 110.

As described above, the controller 130 may receive two streams of video signals VS1 and VS2 respectively from the two input ports 170A and 170B. In certain embodiments, the controller 130 may receive only one stream of video signals from only one of the two input ports 170. For example, the controller 130 may receive only the video signals VS1 from the input port 170A and no signal from the input port 170B. Alternatively, the controller 130 may receive only the video signals VS2 from the input port 170B and no signal from the input port 170A.

When the controller 130 receives only one stream of video signals from only one of the two input ports 170, the signal I/O module 142 may determine the received video signals to be displayed on both of the two display panels 110. For example, when the signal I/O module 142 detects that the controller 130 receives only the video signals VS1 from the input port 170A and no signal from the input port 170B, the signal I/O module 142 determines that both the display panels 110A and 110B are configured to display the video signals VS1. In this case, the signal I/O module 142 generates an instruction for displaying the video signals VS1 on both of the display panels 110A and 110B, and sends the instruction and the video signals VS1 to the pixel control module 144 for processing the display signals.

On the other hand, when the controller 130 receives two streams of video signals respectively from both of the two input ports 170A and 170B, the signal I/O module 142 may determine one stream of video signals to be displayed on one of the two display panels 110, and the other stream of video signals to be displayed on the other of the two display panels 110. For example, the signal I/O module 142 may determine the display panel 110A to display the video signals VS1 received from the input port 170A, and the display panel 110B to display the video signals VS2 received from the input port 170B. In this case, the signal I/O module 142 generates two instructions. One instruction is for displaying the video signals VS1 on the display panel 110A, and the other instruction is for displaying the video signals VS2 on the display panel 110B. The signal I/O module 142 then sends the instructions, the video signals VS1 and the video signals VS2 to the pixel control module 144 for processing the display signals.

In certain embodiments, the signal I/O module 142 may pair the input ports 170 to the display panels 110 according to a fixed pairing relationship. For example, when the controller 130 receives two streams of video signals from both of the two input ports 170, the signal I/O module 142 may determine that the video signals VS1 received from the input port 170A is always displayed on the display panel 110A, and the video signals VS2 received from the input port 170B is always displayed on the display panel 110B. In certain embodiments, however, the signal I/O module 142 may randomly pair the input ports 170 to the display panels 110. In other words, when the controller 130 receives two streams of video signals from both of the two input ports 170, the signal I/O module 142 may determine that the video signals VS1 received from the input port 170A to be randomly displayed on the display panel 110A or the display panel 110B.

The pixel control module 144 generates display signals (the scan signals and data signals) for controlling the pixels 116 of the two display panels 110. When the pixel control module 144 receives an instruction from the signal I/O module 142 to display certain video signals on one of the two display panels 110, the pixel control module 144 generates the corresponding scan signals and data signals according to the video signals, and sends the scan signals and data signals to the scan driver 114 and data driver 112 of the corresponding display panel 110A or 110B. The video signals can include static images or motion videos.

As described above, when the controller 130 receives only one stream of video signals from only one of the two input ports 170, the signal I/O module 142 may generates an instruction for displaying the received video signals on both of the display panels 110, and sends the instruction and the video signals to the pixel control module 144 for processing the display signals. Upon receiving the instruction and the video signals, the pixel control module 144 generates the corresponding scan signals and data signals according to the video signals, and simultaneously sends the scan signals and data signals to the scan driver 114 and data driver 112 of the display panels 110A and 110B. Since the scan signals and data signals are generated from the same video signals, the display panels 110A and 110B simultaneously display the same images.

On the other hand, when the controller 130 receives two streams of video signals respectively from both of the two input ports 170A and 170B, the signal I/O module 142 generates two instructions for displaying the video signals VS1 on the display panel 110A and for displaying the video signals VS2 on the display panel 110B, and sends the instructions, the video signals VS1 and the video signals VS2 to the pixel control module 144 for processing the display signals. Upon receiving the instructions and the video signals, the pixel control module 144 generates the corresponding scan signals and data signals for the display panel 110A according to the video signals VS1, and generates the corresponding scan signals and data signals for the display panel 110B according to the video signals VS2. Then, the pixel control module 144 sends the scan signals and data signals to the scan driver 114 and data driver 112 of the corresponding display panel 110A and 110B simultaneously. Since the scan signals and data signals are generated from different video signals VS1 and VS2, the display panel 110A displays images related to the video signals VS1, and the display panel 110B displays images related to the video signals VS2.

The camera control module 146 controls the operation of the cameras 190. The camera control module 146 can instruct the cameras 190 when (e.g., through a time schedule) to capture the images and also set the frame rate for the images (e.g., 30 frames per second), and receives the images captured by the cameras 190 for processing. In certain embodiments, the camera control module 146 controls the operation of the cameras 190A and 190B simultaneously. In certain embodiments, if the camera 190 generates analog signals, those signals are initially sent to an analog to digital (A/D) converter (not shown) to convert the analog signals to digital frame data.

The backlight control module 148 controls the backlight module 150 to emit light toward the two display panels 110. In certain embodiments, the backlight control module 148 may provide a user interface for a user to adjust the luminance of the backlight module 150.

The backlight module 150 is a double-sided light source for the display panels 110. As shown in FIG. 1A, the backlight module 150 is disposed between the display panels 110A and 110B, and is configured to emit light toward the two display panels 110 respectively. In certain embodiments, the backlight module 150 is configured to emit light whenever the double-sided display device 100 is in operation. In other words, the backlight module 150 may start emitting light when the double-sided display device 100 is turned on. In certain embodiments, a user may adjust the luminance of the backlight module 150 through the backlight control module 148.

In certain embodiments, the backlight module 150 may include one or more light emitting devices. For example, the light emitting device may be a light emitting diode (LED), an electroluminescent (EL) panel, a cold cathode fluorescent lamp (CCFL), a hot cathode fluorescent lamp (HCFL), an external electrode fluorescent lamp (EEFL), or any other types of light source. The size of the backlight module 150 generally corresponds to the size of the display panels 110 such that each pixel 116 of the display panels 110 may receive light emitted by the backlight module 150. In certain embodiments, to provide evenly distributed light to the whole display panels 110, the backlight module 150 may include other elements to improve light distribution. For example, the backlight module 150 may include a plurality of lamps and a diffusing panel to diffuse the light emitted from the lamps to ensure even light distribution to each pixel 116 of the display panels 110.

The input ports 170 are interface ports for transmitting the video signals VS1 and VS2 to the controller 130. In certain embodiments, each of the input ports 170A and 170B may correspond to one of the display panels 110A and 110B.

The cameras 190 are image capturing devices for capturing images of the people passing by or viewing the display panels 110. From now on those people are collectively referred to as the viewers unless otherwise noted. Each of the cameras 190A and 190B corresponds to one of the display panels 110A and 110B, and is configured to capture the images of the viewers under the control of the camera control module 146, and to send the captured images to the controller 130 for further use. For example, the controller 130 may include an image processing module to process the captured image, recognize the viewers in the captured image, and analyze the demographic information of the viewers. In certain embodiments, each of the display panels 110A and 110B may have one or more corresponding cameras.

Figure 4:
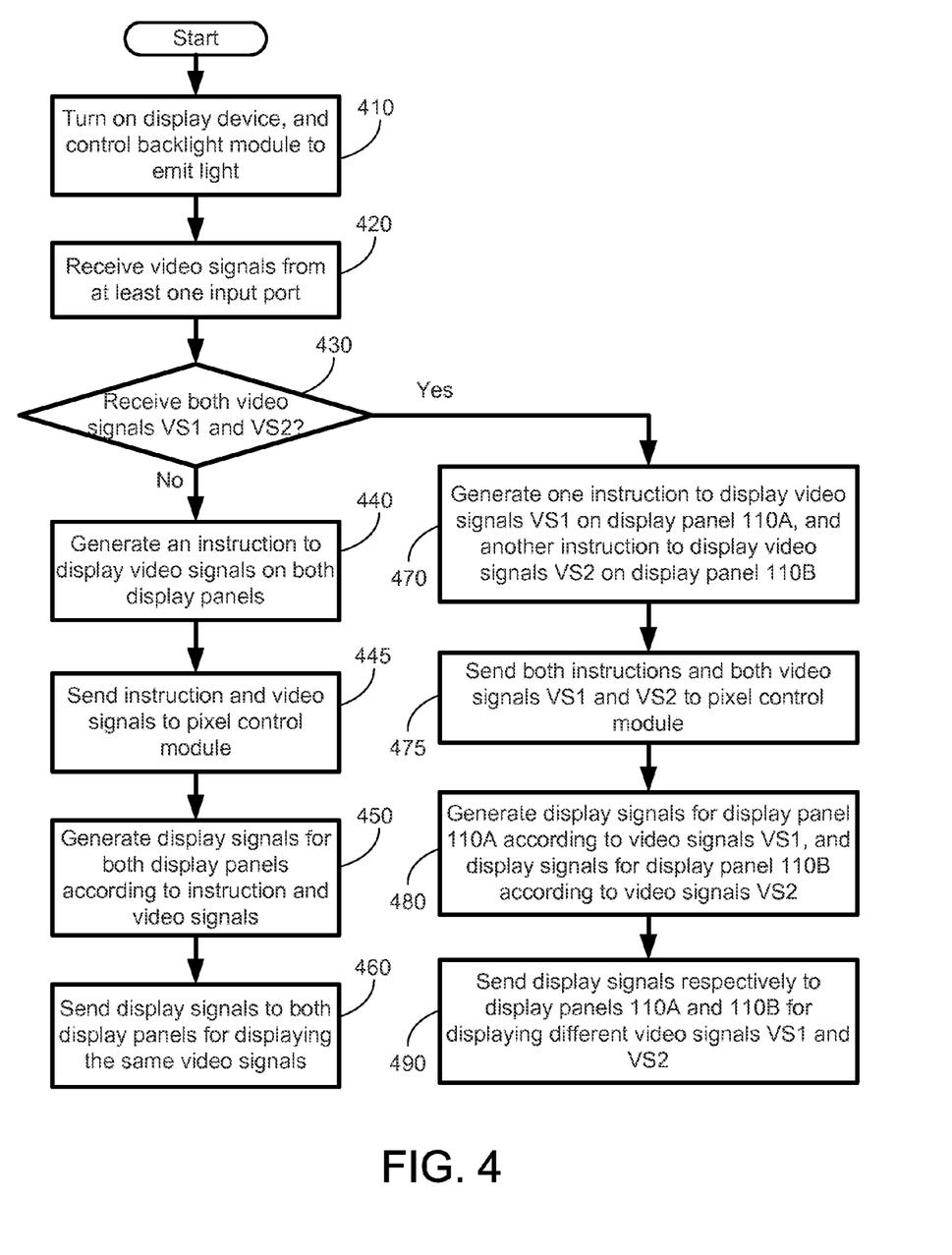
FIG. 4 shows an exemplary flow chart of operation of the double-sided display device according to one embodiment of the present disclosure.

In certain embodiments, the images captured by the cameras 190 are in the format of analog video, which includes one or more image frames. In certain embodiments, the cameras 190 can directly generate digital image frames. To capture the image of the viewers, the cameras 190 are respectively positioned to capture images of an area where the viewers of the display panels 110 are generally expected. In certain embodiments, the cameras 190 can be connected to a USB connector of the controller 130 and, therefore, transmit the images either in digital format or in analog format to the controller 130. FIG. 4 shows an exemplary flow chart of operation of the double-sided display device according to one embodiment of the present disclosure.

At operation 410, the double-sided display device 100 is turned on, and the controller 130 controls the backlight module 150 to start emitting light. Once the double-sided display device 100 is in operation, the controller 130 of the double-sided display device 100 awaits for the video signals coming from any of the input ports 170.

At operation 420, the controller 130 receives the video signals from at least one input port 170A or 170B. At operation 430, the signal I/O module 142 takes control to determine whether the controller 130 receives both video signals VS1 and VS2 from the input ports 170. When the signal I/O module 142 determines that the controller 130 receives only one stream of video signals, the signal I/O module 142 enters operation 440. When the signal I/O module 142 determines that the controller 130 receives both of the video signals VS1 and VS2, the signal I/O module 142 enters operation 470.

When only one stream of video signals is received, at operation 440, the signal I/O module 142 generates an instruction for displaying the received video signals on both of the display panels 110. Then, at operation 445, the signal I/O module 142 sends the instruction and the received video signals to the pixel control module 144. At operation 450, the pixel control module 144 generates display signals (the scan signals and the data signals) for both of the display panels 110 according to the instruction and the video signals. At operation 460, the pixel control module 144 sends the display signals (the scan signals and the data signals) simultaneously to the scan driver 114 and data driver 112 of the display panels 110A and 110B for displaying the same video signals.

On the other hand, when the controller 130 receives both the video signals VS1 and VS2, at operation 470, the signal I/O module 142 generates a first instruction for displaying the video signals VS1 on the display panel 110A, and a second instruction for displaying the video signals VS2 on the display panel 110B. Then, at operation 475, the signal I/O module 142 sends the instructions and the video signals VS1 and VS2 to the pixel control module 144. At operation 480, the pixel control module 144 generates first display signals (the scan signals and the data signals) for the display panel 110A according to the first instruction and the video signals VS1, and generates second display signals (the scan signals and the data signals) for the display panel 110B according to the second instruction and the video signals VS2. At operation 490, the pixel control module 144 respectively sends the first and second display signals (the scan signals and the data signals) simultaneously to the scan driver 114 and data driver 112 of the display panels 110A and 110B for displaying the different video signals VS1 and VS2.

The foregoing description of the example of the digital media management software has been presented only for the purposes of illustration and description and is not intended to be exhaustive or to limit the disclosure to the precise forms disclosed. Many modifications and variations are possible in light of the above teaching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A double-sided display device, comprising:
   a backlight module configured to emit light, wherein the backlight module comprises two light-emitting sides;
   two display panels respectively disposed at the two light-emitting sides of the backlight module, wherein each display panel defines a plurality of pixels in a pixel matrix;
   two cameras respectively disposed at the two light emitting sides of the backlight module, wherein each camera is configured to capture an image frame;
   two input ports; and
   a controller electrically connected to the backlight module, the two display panels and the two input ports, the controller comprising a processor and a non-volatile memory storing computer executable codes, wherein the codes, when executed at the processor, is configured to
   receive video signals from at least one of the two input ports;
   control the backlight module to emit light,
   when the controller receives the video signals from only one of the two input ports, generate display signals according to the video signals, and send the display signals to the two display panels to control the pixels of the two display panels to simultaneously display the same video signals, and
   when the controller receives the video signals from both of the two input ports, generate first display signals according to the video signals received from one of the two input ports and second display signals according to the video signals received from the other of the two input ports, and send the first display signals to one of the two display panels and the second display signals to the other of the two display panels to control the two display panels to respectively display the video signals received from the two input ports.

2. The double-sided display device as claimed in claim 1, wherein the codes comprise:
   a backlight control module configured to control the backlight module to emit light;
   a signal input/output (I/O) module configured to determine whether the controller receives the video signals from one or both of the two input ports, and generate instructions according to the determination; and
   a pixel control module configured to generate the display signals for the two display panels according to the instructions generated by the signal I/O module, and send the display signals respectively to the two display panels to control the pixels of the display panels.

3. The double-sided display device as claimed in claim 2, wherein when the controller receives the video signals from only one of the two input ports, the signal I/O module is configured to generate an instruction according to the video signals for displaying the video signals on both of the display panels, and send the instruction to the pixel control module.

4. The double-sided display device as claimed in claim 3, wherein when the pixel control module receives the instruction from the signal I/O module, the pixel control module is configured to generate the display signals according to the instruction, and send the display signals simultaneously to both of the display panels.

5. The double-sided display device as claimed in claim 2, wherein when the controller receives the video signals from both of the two input ports, the signal I/O module is configured to
   generate a first instruction according to the video signals received from one of the input ports for displaying the video signals on one of the display panels,
   generate a second instruction according to the video signals received from the other of the input ports for displaying the video signals on the other of the display panels, and
   send the first instruction and the second instruction to the pixel control module.

6. The double-sided display device as claimed in claim 5, wherein when the pixel control module receives the first instruction, the second instruction and the video signals from the signal I/O module, the pixel control module is configured to:
   generate the first display signals according to the first instruction,
   generate the second display signals according to the second instruction, and
   send the first display signals to one of the two display panels, and send the second display signals to the other of the two display panels.

7. The double-sided display device as claimed in claim 2, wherein the codes further comprise:
   a data store configured to store parameters of the display panels.

8. The double-sided display device as claimed in claim 1, wherein the display signals comprise a plurality of scan signals and a plurality of data signals.

9. The double-sided display device as claimed in claim 8, wherein each of the display panels comprises:
   a scan driver electrically connected to the controller, configured to receive the scan signals from the controller;
   a data driver electrically connected to the controller, configured to receive the data signals from the controller;
   a plurality of scan lines electrically connected to the scan driver, each scan line configured to receive one of the scan signals from the scan driver; and a plurality of data lines electrically connected to the data driver, each data line configured to receive one of the data signals from the data driver;

wherein the scan lines and data lines cross over to define the plurality of pixels.

10. The double-sided display device as claimed in claim 1, wherein the codes further comprise:

a camera control module configured to control each of the cameras to capture the image frames.

11. A method of controlling a double-sided display device, comprising:

receiving, at a controller, video signals from at least one of two input ports of the double-sided display device;

controlling a backlight module of the double-sided display device to emit light, wherein the backlight module comprises two light-emitting sides;

controlling two cameras of the double-sided display device to capture image frames, wherein the two cameras are respectively disposed at the two light emitting sides of the backlight module;

when the video signals are received from only one of the two input ports, generating, at the controller, display signals according to the video signals, and sending the display signals to two display panels of the double-sided display device, wherein the two display panels are respectively disposed at the two light-emitting sides of the backlight module, each display panel defines a plurality of pixels in a pixel matrix, and wherein the display signals are configured to control the pixels of the two display panels to simultaneously display the same video signals, and when the video signals are received from both of the two input ports, generating, at the controller, first display signals according to the video signals received from one of the two input ports and second display signals according to the video signals received from the other of the two input ports, and sending the first display signals to one of the two display panels and the second display signals to the other of the two display panels to control the two display panels to respectively display the video signals received from the two input ports.

12. The method as claimed in claim 11, wherein the controller stores computer executable codes comprising:

a backlight control module configured to control the backlight module to emit light;

a signal input/output (I/O) module configured to determine whether the controller receives the video signals from one or both of the two input ports, and generate instructions according to the determination; and a pixel control module configured to generate the display signals for the two display panels according to the instructions generated by the signal I/O module, and send the display signals respectively to the two display panels to control the pixels of the display panels.

13. The method as claimed in claim 12, wherein when the video signals are received from only one of the two input ports, the controller generates the display signals by generating, at the signal I/O module, an instruction according to the video signals for displaying the video signals on both of the display panels;

sending the instruction from the signal I/O module to the pixel control module; and generating, at the pixel control module, the display signals according to the instruction.

14. The method as claimed in claim 12, wherein when the video signals are received from both of the two input ports, the controller generates the first display signals and the second display signals by generating, at the signal I/O module, a first instruction according to the video signals received from one of the input ports for displaying the video signals on one of the display panels;

generating, at the signal I/O module, a second instruction according to the video signals received from the other of the input ports for displaying the video signals on the other of the display panels;

sending the first instruction and the second instruction from the signal I/O module to the pixel control module;

generating, at the pixel control module, the first display signals according to the first instruction; and generating, at the pixel control module, the second display signals according to the second instruction.

15. The method as claimed in claim 11, wherein the display signals comprise a plurality of scan signals and a plurality of data signals.

16. The method as claimed in claim 15, wherein each of the display panels comprises:

a scan driver electrically connected to the controller, configured to receive the scan signals from the controller;

a data driver electrically connected to the controller, configured to receive the data signals from the controller;

a plurality of scan lines electrically connected to the scan driver, each scan line configured to receive one of the scan signals from the scan driver; and a plurality of data lines electrically connected to the data driver, each data line configured to receive one of the data signals from the data driver;

wherein the scan lines and data lines cross over to define the plurality of pixels.

17. A non-transitory computer readable medium storing computer executable codes for controlling a double-sided display device, wherein the codes, when executed at a processor, are configured to receive video signals from at least one of two input ports;

control a backlight module to emit light, wherein the backlight module comprises two light-emitting sides;

control two cameras to respectively capture image frames, wherein the two cameras are respectively disposed at the two light-emitting sides of the backlight module;

when the video signals are received from only one of the two input ports, generate display signals according to the video signals, and send the display signals to two display panels respectively disposed at the two light-emitting sides of the backlight module, wherein each display panel defines a plurality of pixels in a pixel matrix, and wherein the display signals are configured to control the pixels of the two display panels to simultaneously display the same video signals, and when the video signals are received from both of the two input ports, generate first display signals according to the video signals received from one of the two input ports and second display signals according to the video signals received from the other of the two input ports, and send the first display signals to one of the two display panels and the second display signals to the other of the two display panels to control the two display panels to respectively display the video signals received from the two input ports.

18. The non-transitory computer readable medium as claimed in claim 17, wherein the codes comprise:

a backlight control module configured to control the backlight module to emit light;

a signal input/output (I/O) module configured to determine whether the controller receives the video signals from one or both of the two input ports, and generate instructions according to the determination;

a pixel control module configured to generate the display signals for the two display panels according to the instructions generated by the signal I/O module, and send the display signals respectively to the two display panels to control the pixels of the display panels; and a camera control module configured to control the two cameras to respectively capture the image frames.

19. The non-transitory computer readable medium as claimed in claim 18, wherein when the video signals are received from only one of the two input ports, the signal I/O module is configured to generate an instruction according to the video signals for displaying the video signals on both of the display panels, and send the instruction to the pixel control module.

20. The non-transitory computer readable medium as claimed in claim 19, wherein when the pixel control module receives the instruction from the signal I/O module, the pixel control module is configured to generate the display signals according to the instruction, and send the display signals simultaneously to both of the display panels.

21. The non-transitory computer readable medium as claimed in claim 18, wherein when the video signals are received from both of the two input ports, the signal I/O module is configured to generate a first instruction according to the video signals received from one of the input ports for displaying the video signals on one of the display panels, generate a second instruction according to the video signals received from the other of the input ports for displaying the video signals on the other of the display panels, and send the first instruction, the second instruction and the video signals to the pixel control module.

22. The non-transitory computer readable medium as claimed in claim 21, wherein when the pixel control module receives the first instruction, the second instruction and the video signals from the signal I/O module, the pixel control module is configured to:

generate the first display signals according to the first instruction, generate the second display signals according to the second instruction, and send the first display signals to one of the two display panels, and send the second display signals to the other of the two display panels.

23. The non-transitory computer readable medium as claimed in claim 18, wherein the codes further comprise:

a data store configured to store parameters of the display panels.

* * * * *